United States Patent
Chan et al.

(10) Patent No.: US 9,224,165 B2
(45) Date of Patent: Dec. 29, 2015

(54) DEPLOYING MULTIPLE E-COMMERCE SYSTEMS IN A SINGLE COMPUTING PLATFORM

(71) Applicant: International Business Machines Corporation, Armonk, NY (US)

(72) Inventors: Victor Chan, Thornhill (CA); Mark William Hubbard, Maple (CA); Darshanand Khusial, Mississauga (CA); Lev Mirlas, Thornill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/080,779

(22) Filed: Nov. 14, 2013

(65) Prior Publication Data

US 2014/0180858 A1 Jun. 26, 2014

Related U.S. Application Data

(62) Division of application No. 10/907,161, filed on Mar. 23, 2005, now Pat. No. 8,612,379.

(30) Foreign Application Priority Data

Apr. 20, 2004 (CA) ..................... 2464992

(51) Int. Cl.
*G06F 17/00* (2006.01)
*G06Q 30/06* (2012.01)

(52) U.S. Cl.
CPC ............ *G06Q 30/0601* (2013.01); *G06Q 30/06* (2013.01)

(58) Field of Classification Search
CPC .................... G06F 17/30578; G06F 17/30575; G06F 11/1456; G06F 11/1464; G06F 11/2097; G06F 17/30581; G06F 11/1446
USPC .......................................... 707/618
See application file for complete search history.

(56) References Cited

U.S. PATENT DOCUMENTS

| | | | |
|---|---|---|---|
| 2002/0010700 A1* | 1/2002 | Wotring et al. | 707/100 |
| 2002/0026386 A1* | 2/2002 | Walden | 705/27 |

* cited by examiner

*Primary Examiner* — Truong Vo
(74) *Attorney, Agent, or Firm* — Steven M. Greenberg, Esq.; CRGO LAW

(57) ABSTRACT

A method, system, architecture and apparatus for deploying multiple e-commerce systems in a single computing platform. In accordance with the present invention, an e-commerce systems architecture can include an instantiable owning business logic component derived from an abstract business definition and one or more instantiable business element components configured for aggregation under the control of a business facility instance. The business facility instance can include a coupling to an instance of the owning business logic component. Finally, the architecture can include an instantiable partner business component derived from the abstract business definition. In particular, the instantiable partner business component can include a configuration for limited access to selected ones of the instantiable business element components aggregated under the control of the business facility instance.

10 Claims, 5 Drawing Sheets

DEPLOYING MULTIPLE E-COMMERCE SYSTEMS IN A SINGLE COMPUTING PLATFORM

CROSS-REFERENCE TO RELATED APPLICATION

This application is a Divisional Application of U.S. application Ser. No. 10/907,161, filed on Mar. 23, 2005, entitled "DEPLOYING MULTIPLE E-COMMERCE SYSTEMS IN A SINGLE COMPUTING PLATFORM", which claims priority to Canadian Patent Application 2464992, filed Apr. 20, 2004, the entirety of which is incorporated herein by reference.

BACKGROUND OF THE INVENTION

The present invention relates to e-commerce systems deployment and more particularly to deploying e-commerce computing systems for different business operations in a host computing platform.

Description of the Related Art

Business entities generally own assets and conduct or engage in various business activities relating to those assets. For example, a business may own inventory which the business may sell to end users. The business similarly can maintain the inventory which the business can lease to end users. In either case, the business can acquire the inventory from suppliers. To support these rudimentary business activities, a business can be organized as a set of business facilities, each such facility having the responsibility for carrying out specific aspects of the business activities. For example, a business may have several branch offices, each office conducting core business activities in a specific geographic region. Alternatively, a business may be partitioned into several divisions, each division handling a specific set of business activities for a particular aspect of the market, for instance, a women's clothing division and a men's clothing division.

The modern business enterprise can engage in multiple operations, each having a discrete business purpose. As an example, a business enterprise can include a selling operation, a distribution operation for supplying the selling operation with saleable product, and a fulfillment operation charged with the fulfillment of customer orders. To support the various operations of the business, the business can include selling facilities, distribution facilities, and fulfillment facilities. Hence, it will be apparent that business activities are in fact supported by the coordinated operation of several business facilities, which tend to be controlled by the business.

The possibilities of activities in which a business enterprise can engage seem to be as endless as the creativity of enterprise in society. In fact, even if two business organizations engage in similar activities, the two business organizations may be organized in a completely different way, each utilizing very different types of business facilities. Accordingly, a principal challenge in implementing business processes in the online computing environment is how to represent a business and its associated business facilities in the underlying computing application.

Generally, the activities of a single business enterprise can be modeled in a manner which is consistent with the existence and utilization of one or more business facilities. Little reuse of computing logic can occur for different business enterprises as the type, number and arrangement of facilities can vary from business enterprise to business enterprise. In fact, one can see that with all of the complexity of the computing models for the modern business enterprise, each business must reside in its own computing environment to support and automate its respective business processes. Moreover, because of the uniqueness of the processes of each business facility, each business facility frequently must be implemented within its own computing infrastructure, using its own computing resources.

Presently, the model of the single business enterprise can be implemented electronically through the use of an e-commerce suite. Conventional e-commerce suite product offerings include a virtual storefront designer, an application server, database management system, and a messaging system. The virtual storefront designer can be used to develop the user interface components and underlying logic for operating a virtual storefront. The logic and user interface together can be deployed through the use of the application server, database management system and messaging system to form a single site. In all cases, the single site can include the model for only a single storefront operation.

Nevertheless, it would seem logical that substantial cost, maintenance and performance advantages could derived through the co-location of multiple storefront operations in a single site. In fact, it would be desirable, if possible, to co-locate the underlying computing resources of business facilities, notwithstanding that each co-located business facility may be relied upon by one or more different business operations. In this regard, it is to be understood that a large business enterprise can have multiple business lines, each operating independently of one another. Alternatively, in a managed hosting environment, it can be cost effective to manage multiple e-commerce systems for different businesses in a single computing platform. In either case, conventional e-commerce suite technologies cannot segregate the business activities of different facilities from one another in a single site. As a result, a single suite effectively can host only a single, logical business operation.

SUMMARY OF THE INVENTION

The present invention addresses the deficiencies of the art in respect to deploying e-commerce systems supporting a business operation and provides a novel and non-obvious method, system, architecture and apparatus for co-locating multiple e-commerce systems supporting respective business operations in a single, host computing platform. An e-commerce systems host computing platform which has been configured in accordance with the present invention can include a server computing device having storage and network connectivity to at least one remote client computing device over a computer communications network. An application server further can be disposed in the server computing device. Finally, a defined business application operation architecture can be configured for concurrently deploying multiple different business operation applications through the application server in the server computing device.

In accordance with the present invention, an e-commerce systems architecture can include an instantiable owning business logic component derived from an abstract business definition and one or more instantiable business element components configured for aggregation under the control of a business facility instance. The business facility instance can include a coupling to an instance of the owning business logic component. Finally, the architecture can include an instantiable partner business component derived from the abstract business definition. In particular, the instantiable partner business component can include a configuration for limited access to selected ones of the instantiable business element components aggregated under the control of the business facility instance.

In the architecture of the present invention, each of the instantiable business element components can include an association with at least one of an asset, a business policy and an algorithmic process. Importantly, an instantiable business provisioning hub component can be configured for association with at least one business facility instance. Finally, the instantiable owning business logic can include logic for subscribing to an authorization domain having registration policies and access control policies.

The architecture of the present invention can be utilized to support a co-locatable e-commerce system. The co-locatable e-commerce system can include a root organization component and a user organization component controlled by the root organization component. The co-locatable e-commerce system also can include a first selling organization component which can be controlled by the root organization component. The first selling organization component also can have a configuration enabling the component to be accessed by the user organization component. Finally, the co-locatable e-commerce system can include at least one other selling organization component which can be controlled by the root organization component and which further can have a configuration for permitting access to the other selling organization component by the user organization component. The user organization component can include a shopper organization component. The user organization component further can include an administrative organization component.

The first selling organization component can include a business to consumer component. The first selling organization component also can include one or more reseller organization components, and a hub organization component configured to manage assets accessed by the reseller organization components. The hub organization can include an asset organization component configured to manage assets accessed by the reseller organization components; and, a management organization component configured to manage access to the assets by the reseller organization components.

A method of deploying multiple e-commerce systems in a single computing platform can include the steps of locating a first instance of a business logic component for a first business operation in the single computing platform; and co-locating a second instance of a business logic component for a second business operation with the first instance of the business logic component in the single computing platform. The method further can include the step of associating at least one instance of a first business facility with the first instance of the business logic component; and, associating at least one instance of a second business facility with the second instance of the business logic component.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for co-locating multiple business operations in a single, host computing platform. In accordance with the present invention, a business facility can be programmatically defined so that one or more instances of a business facility can be created by different business operations in the computing platform. Each business facility can include one or more business elements, which when combined, provide the functionality of the business facility. To that end, each business element can include assets managed in and by the facility, policies for interacting with the assets, and logic defined for interacting with the facility.

Different business operations can be defined in terms of the underlying business facilities and their constituent business elements. In this regard, for each business operation, the requisite number and arrangement of business elements can be instantiated and rendered operable to support the business operation. Consequently, by providing a common architecture for supporting multiple, different business operations, multiple different business operations can be co-located in a single, host computing platform. As such, several previously unattainable advantages can be realized including cost-savings, ease of management and performance enhancement.

Figure 1:
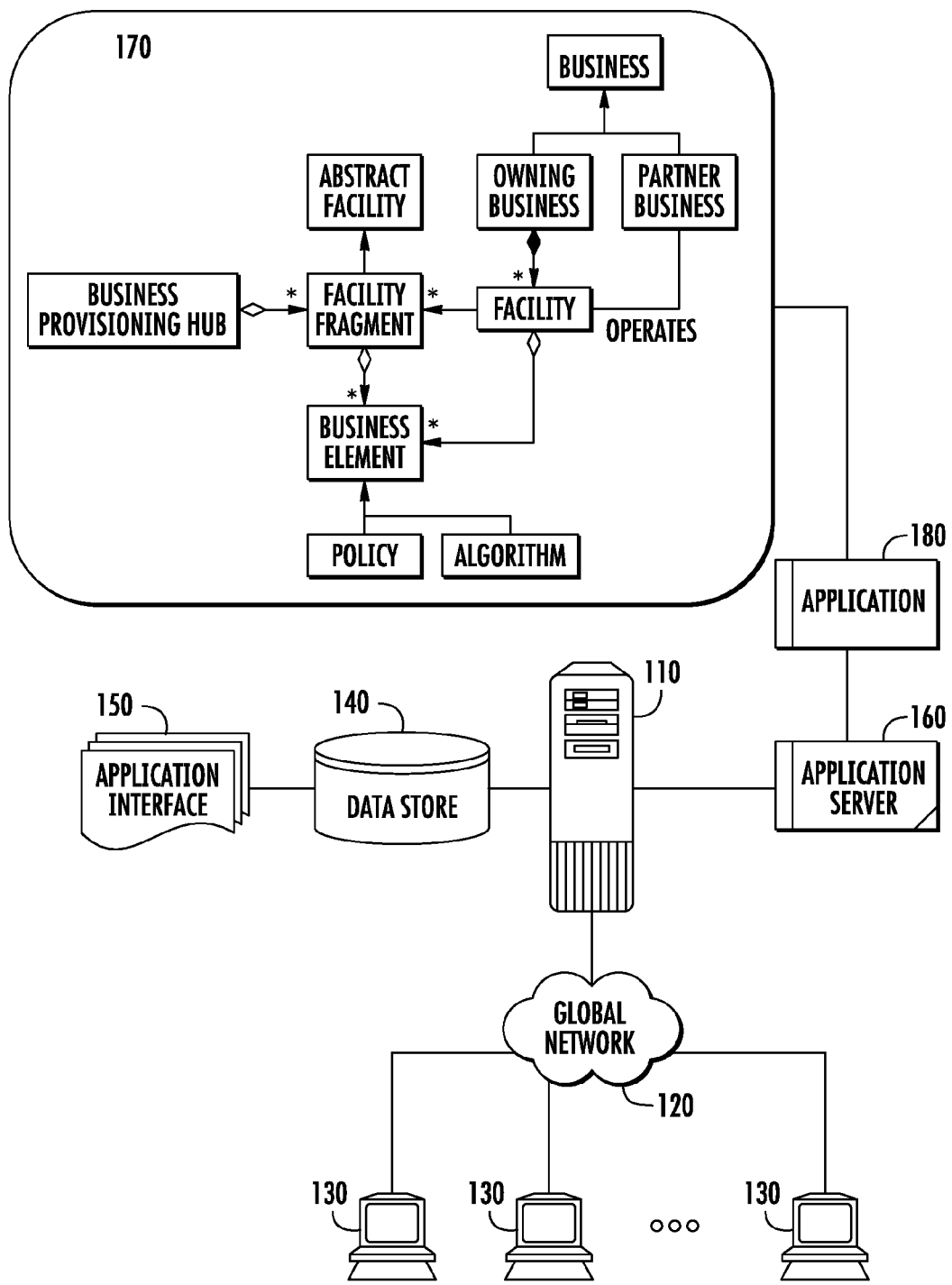
FIG. 1 is a schematic illustration of a computing platform configured for deploying multiple e-commerce systems for different business operations.

In more particular illustration of the foregoing inventive arrangement, FIG. 1 is a schematic illustration of a computing platform configured for deploying multiple e-commerce systems for different business operations. The computing platform can include a computing server 110 coupled to one or more computing clients 130 over a computer communications network 120. The computing server 110 can be configured to host one or more e-commerce systems representative of one or more respective business operations.

The computing server 110 can include an application server 160 programmed to host and manage a distributable application over the network 120. The computing server 110 further can include a data store 140 configured to store an application interface 150 to one or more applications 180 operating through the application server 160. Importantly, the computing server 110 also can include a defined business operation application architecture 170. Specifically, instances of the business operation application architecture 170 can be created through the application server 160 to support corresponding business operations. Consequently, multiple business operations can be co-located within the platform of FIG. 1.

Figure 2:
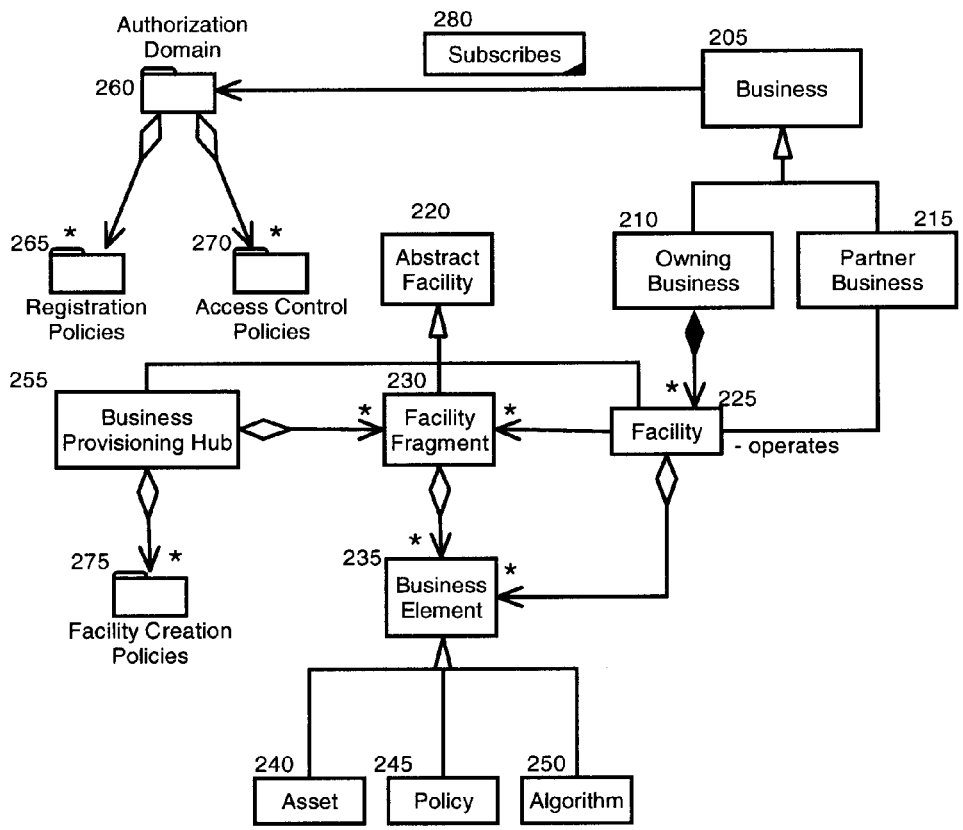
FIG. 2 is an object diagram illustrating an e-commerce architecture for deploying multiple e-commerce systems for different business operations in the computing platform of FIG. 1.

As a more specific illustration, FIG. 2 is an object diagram illustrating an e-commerce architecture for deploying multiple e-commerce systems for different business operations in the computing platform of FIG. 1. The architecture can include one or more business elements 235. Each of the business elements 235 can be an aggregation of one or more assets 240, one or more policies 245 and one or more algorithmic processes 250. The assets 240 can include data stored on a file system graphics files, markup language documents, and server pages. The assets 240 further can include data stored in a database such as member, catalog, and order information. The business policies 245, by comparison, can include contract policies that determine the price of products. Finally, the algorithmic processes 250 can include commands and tasks that perform business logic and render views.

One or more of the business elements 235 can be grouped together as a facility fragment 230. The facility fragment 230 can be private or shareable. Notably, a business facility 225 can create one or more facility fragments 230 in furtherance of the activities of the business facility, such as the operation of an on-line store. In a preferred aspect of the invention, the facility 225 can be modeled as an on-line store. Notably, the assets 240 can be used to present a visual interface to the business activity to end users. The business policies 245 and the algorithmic processes, in turn, can be programmed to drive the process flow of the business activity, to enforce the rules of the business activity, and to define the capabilities of the business activity.

A business 205 can be composed from one or more facilities 225 and the business 205 can subscribe 280 to an authorization domain 260. The authorization domain 260 can provide access control to determine those users allowed to create, update, delete or invoke the various business elements 235 of a business 205. In this regard, the authorization domain 260 can include both registration policies 265, and also access control policies 270.

Notably, a business 205 can be an owning business 210 or a partner business 215. An owning business 210 can include a business which maintains control over all of its associated facilities 225. An example of an owning business can include a Business to Consumer (B2C) store where the merchant supplies and control all the file assets, data assets, business policies, and algorithmic processes. A partner business 215, by comparison, can include a business which has only limited control over its facilities 225. A partner business 215 can include, for instance, a merchant who is acting as a reseller for part of a catalog. In this case, the partner business 215 can supply its own assets 240 and business policies 245 that provides a different look and feel to the catalog, though the data and algorithm processes can be accessed from shareable facility fragments 230 not controlled by the partner business 215.

To maintain control over shareable facility fragments 230, a business provisioning hub 255 can be included in the architecture of FIG. 2. The business provisioning hub can control one or more shareable facility fragments 230. The business provisioning hub 255 also can control its own facility 225 which can provide self-management features to allow a partner business 215 to register itself and to obtain shareable assets. The business provisioning hub 255 can have an association with an owning business 210 which can subscribe to facility creation policies 275 that govern what self-management operations a partner business 215 is allowed to perform and the rights of the partner business 215 in managing its own facilities 225.

Figure 3:
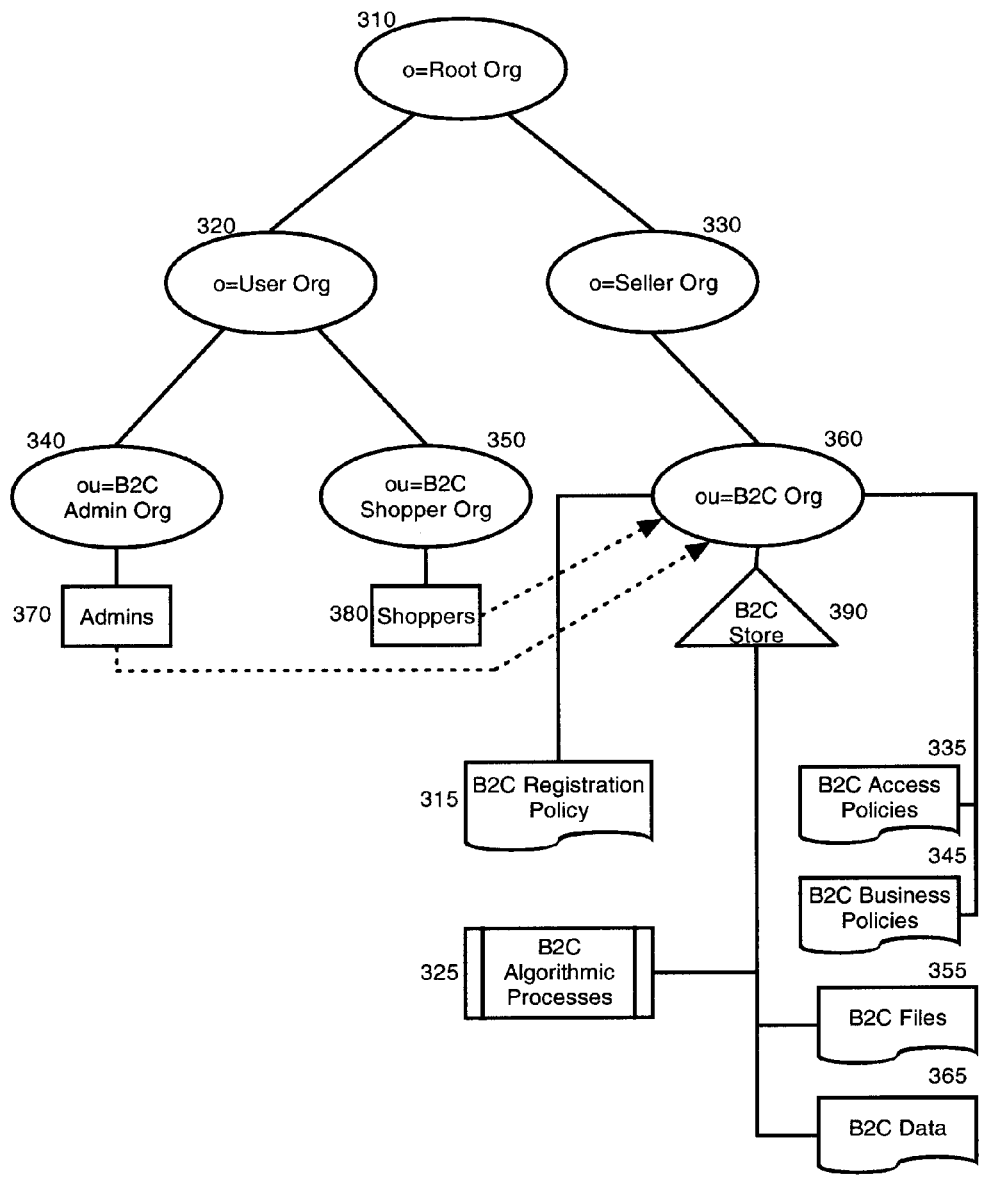
FIG. 3 is a hierarchical diagram of a B2C e-commerce system implemented according to the architecture of FIG. 2.

Using the artifacts illustrated in the architecture of FIG. 2, e-commerce systems can be implemented and deployed in a single, hosting platform, which e-commerce systems can range from a simple B2C online businesses to very complex channel management deployments. For instance, FIG. 3 is a hierarchical diagram illustrating a B2C e-commerce system implemented according to the architecture of FIG. 2. In the diagram businesses are represented as organizations, shown as ovals. In a computing environment all the businesses are owned by a single organization known as the Root Organization 310. The Root Organization 310 can control other businesses, but the Root Organization 310 does not control in many cases its own facilities.

The User Organization 320 can control an administrators organization 340 and a shopper organization 350. The User Organization 320 further can control other organizations that contain users because, if there is need to integrate with external user repositories such as an LDAP directory, then the other non-user organizations need not be persisted to LDAP. Rather, in the case of an LDAP integration, the User Organization 320 can map to the LDAP root organization. The Seller Organization 330, unlike the User Organization 320, can control the B2C Organization 360 which itself controls a standalone facility.

The facility controlled by the B2C Organization 360 can contain business elements that enable the B2C Organization 360 to operate an online store. In this regard, shoppers 380 can browse the wares of the B2C Organization 360 by electronically referencing the B2C store front 390. The pages of the B2C store front 390 that the shoppers 380 can browse typically can be composed from the B2C file assets 355. For example, the B2C file assets can include server pages, markup and graphic images. The data 365 obtained by the file assets 355 can include user personalization data, product data, pricing data and the like.

The Business Policies 345 limit the type and content of information which can be displayed to the shoppers 380, such as prices for products. The shoppers further can perform any activities that are part of the B2C algorithmic processes 325 such as executing a command to add a new item to a shopping cart, or to check out from the store, provided that this is allowed by the access control policies 335 governed by the B2C Authorization Policies 315 to which the B2C business subscribes. Finally, shoppers 380 associated with the shopper organization 350 and administrators 370 associated with the administrators organization 340 participate in a particular role in the business operations, which in conjunction with the access control policies 335 determine what operations a user is allowed to perform when interacting with the business operation.

Figure 4:
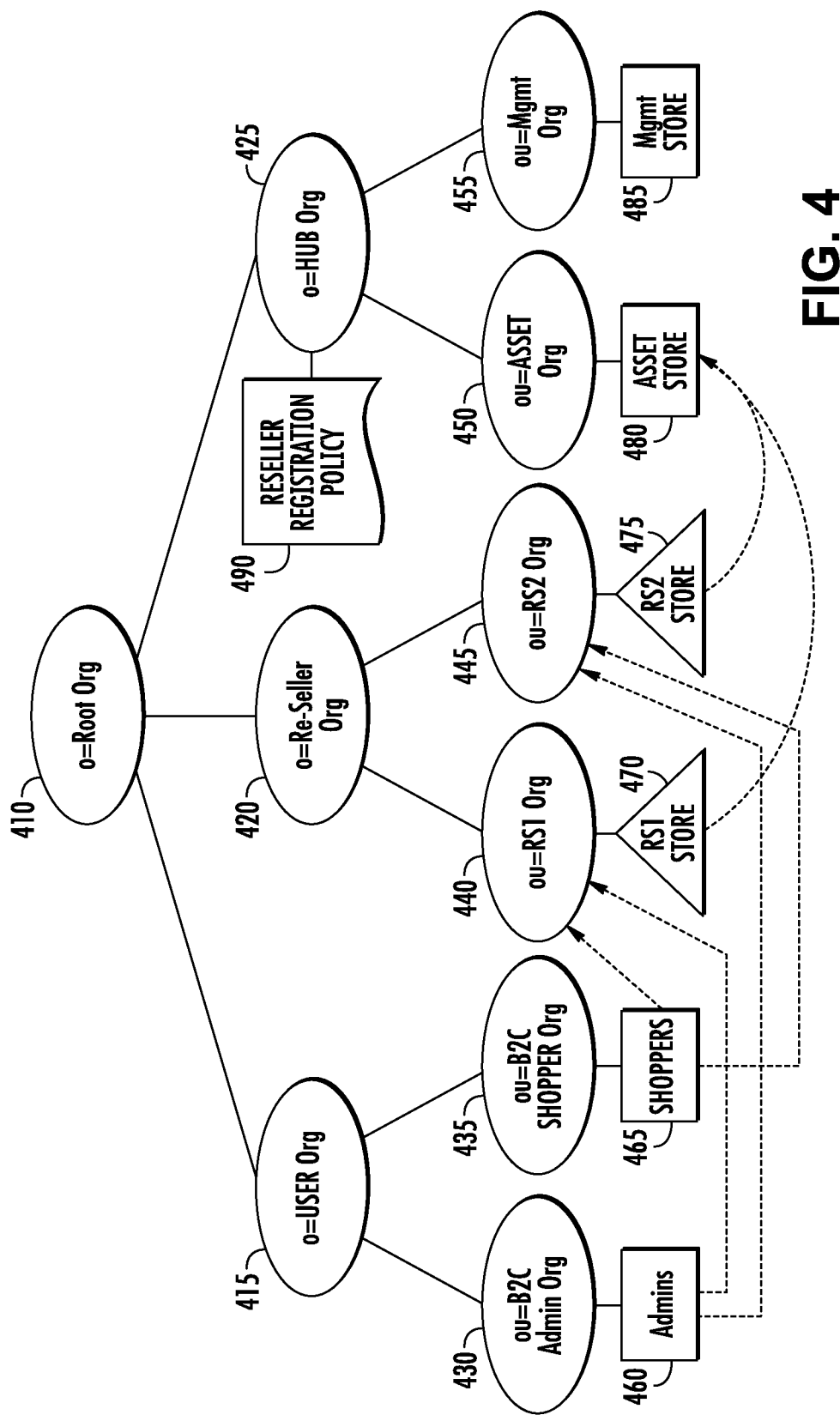
FIG. 4 is a hierarchical diagram of a multi-reseller e-commerce system regulated through a management hub and implemented in a single, host computing platform according to the architecture of FIG. 2; and, FIG. 5 is a hierarchical diagram of a mixed multi-reseller and B2C e-commerce system regulated through a management hub and implemented in a single, host computing platform according to the architecture of FIG. 2.

While FIG. 3 depicts a simpler B2C e-commerce system deployment, the invention is not so limited and more complex arrangements are made possible by the architecture shown in FIG. 2. As an example, FIG. 4 is a hierarchical diagram of a multi-reseller e-commerce system regulated through a management hub and implemented in a single, host computing platform according to the architecture of FIG. 2. As before in the case of the simple B2C system, in the multi-reseller system depicted in FIG. 3, a Root Organization 410 can own a User Organization 415. In addition, the Root Organization 410 can own a Re-Seller Organization 420 and Hub Organization 425, which can be associated with a Re-Seller Registration Policy 490.

The Re-Seller Organization 420 can include a multiplicity of reselling organizations 440, 445 (only two shown for purposes of simplicity), each providing the operative functionality of a virtual store 470, 475 using the business element mechanism of the architecture of the present invention. Notably, the reselling organizations 440, 445 do not in of themselves control their inventory assets. Rather, the reselling organizations 440, 445 merely access the assets of the Asset Organization 450 as a partner business rather than an owning business.

The User Organization 415 can control both an Administrative Organization 430 and a Shopper Organization 435. The Administrative Organization 430 can provide a role for the administrators 460 with which the administrators 460 can access and managing the operations of the reselling organizations 440, 445. The Shopper Organization 435, by comparison, can include the shoppers 465 empowered to shop the virtual stores 470, 475 provided by the reselling organizations 440, 445. In this regard, to the shoppers 465, the virtual stores 470, 475 appear as if to own the inventory assets managed by the Asset Organization 450 and purchase transactions with the reselling organizations 440, 445 appear to be seamless from the perspective of the shoppers 465.

Importantly, the Hub Organization 425 provides management capabilities to allow the partner businesses to self-register themselves to access the assets and functionality managed through organizations controlled by the Hub Organization 425. The management capabilities are provided by the Management Organization 455 and all of its artifacts provided through the "Management Store" 485. Separately, the Hub Organization 425 can provide through the Asset Organization 450 those business elements that can be used by the reselling organizations 440, 445 through an "Asset Store" 480.

In operation, a business partner can register by visiting the Management Store 485 provided by the Management Organization 455. As part of the registration process a partner business can be created. For example, the partner business can be a reselling organization 440, 445. Notably, the partner business can be bootstrapped with an administrator who has been given administrative roles as defined by the registration policies 490. These administrative roles allow the business partner to create additional administrators 460 to manage its customers, and administrator its store. In the example shown in FIG. 4, the administrators 460 can be owned by the Administrative Organization 430. Also, the created business partner can be given access to use the shareable resources owned by the Asset Organization 450 to host within the store of the business partner.

Significantly, the architecture of FIG. 2 can permit additional combinations of business operations, such as multi-reseller and direct B2C configurations (as well as B2B configurations) in a single, host computing platform. In this regard, each new business operation can be added as an organization owned by the root organization. While the seller organizations can control their own assets, just the same the seller organizations can access the assets of business partner organization through a management hub. In this way, the operations of the different businesses can coexist in a single host computing platform without requiring separate computing facilities for each business operation.

Figure 5:
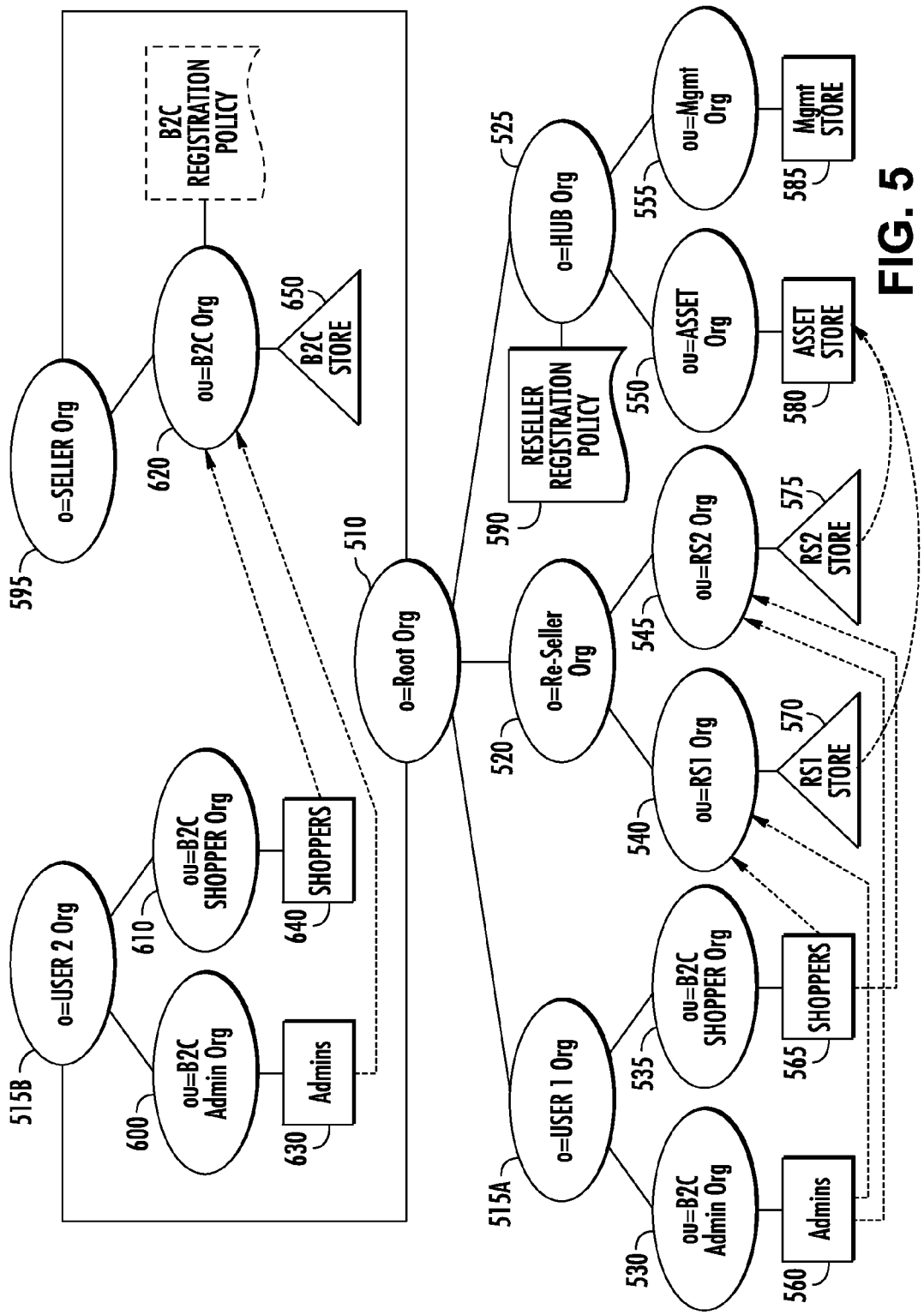

Specifically, FIG. 5 is a hierarchical diagram of a mixed multi-reseller and B2C e-commerce system regulated through a management hub and implemented in a single, host computing platform according to the architecture of FIG. 2. As shown in FIG. 5, a multi-reseller e-commerce system can be coupled to the Root Organization 510 which can own a first User Organization 515A for the multi-reseller e-commerce system. In addition, the Root Organization 510 can own a Re-Seller Organization 520 and Hub Organization 525, which can be associated with a Re-Seller Registration Policy 590.

The Re-Seller Organization 520 can include a multiplicity of reselling organizations 540, 545 (only two shown for purposes of simplicity), each providing the operative functionality of a virtual store 570, 575 using the business element mechanism of the architecture of the present invention. Notably, the reselling organizations 540, 545 do not in of themselves control their inventory assets. Rather, the reselling organizations 540, 545 merely access the assets of the Asset Organization 550 as a partner business rather than an owning business.

The User Organization 515 can control both an Administrative Organization 530 and a Shopper Organization 535. The Administrative Organization 530 can provide a role for the administrators 560 with which the administrators 560 can access and managing the operations of the reselling organizations 540, 545. The Shopper Organization 535, by comparison, can include the shoppers 565 empowered to shop the virtual stores 570, 575 provided by the reselling organizations 540, 545. In this regard, to the shoppers 565, the virtual stores 570, 575 appear as if to own the inventory assets managed by the Asset Organization 550 and purchase transactions with the reselling organizations 540, 545 appear to be seamless from the perspective of the shoppers 565.

As in the multi-reseller case of FIG. 4, the Hub Organization 525 provides management capabilities to allow the partner businesses to self-register themselves to access the assets and functionality managed through organizations controlled by the Hub Organization 525. The management capabilities are provided by the Management Organization 525 and all of its artifacts provided through the "Management Store" 585. Separately, the Hub Organization 555 can provide through the Asset Organization 550 those business elements that can be used by the reselling organizations 540, 545 through an "Asset Store" 580.

In addition to the multi-reseller e-commerce system, a B2C e-commerce system can be deployed within the same host computing platform as shown in FIG. 5. In particular, the Root Organization 510 can control both a second User Organization 515B and a Seller Organization 595. The Seller Organization 595 can control the B2C Organization 620 which itself controls a standalone facility. The facility controlled by the B2C Organization 620 can contain business elements that enable the B2C Organization 620 to operate an on-line store. In this regard, shoppers 640 can browse the wares of the B2C Organization 620 by electronically referencing the B2C store front 650.

It will be recognized by the skilled artisan that the business models implemented in the host computing platform are not limited strictly to the multi-reseller and B2C paradigm. Rather, it is also contemplated that other business models can be accommodated within the single host computing platform of the present invention. For instance, a business-to-business (B2B) Direct model can be accommodated in which a merchant sells directly to companies.

Also, a B2B Direct Extended Sites model can be accommodated in which merchants can request for their stores to be hosted by an Internet Service Provider (ISP). In the B2B Direct Extended Sites model, a new merchant access the hosting hub of the ISP to request a new store. Subsequently, the new merchant can proceed to create a store. Finally, the new merchant can open the store to the general public. The ISP, however, can maintain control over shared assets for the hosted stores.

A Demand Chain model also can be accommodated in which a channel hub acts as the marketplace where resellers buy products from distributors to resell to the consumers. The consumer direct stores, distributors, and their relationships can be dynamically created in the Demand Chain model. Similarly, a Supply Chain model can be accommodated in which a supplier hub acts as the marketplace bringing together suppliers and their buyers. The supplier stores and buyers in addition to their relationships with one another can be dynamically created in the Supply Chain model.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A co-locatable e-commerce system comprising:
    a computing platform comprising a computing server coupled to one or more computing clients over a computer communications network, the computing server being configured to host one or more e-commerce systems representative of one or more respective business operations, the computing server including an application server programmed to host and manage a distributable application over the network, the computing server further including a data store configured to store an application interface to one or more applications operating through the application server, the computing server also including a defined business operation application architecture created through the application server and supporting corresponding business operations co-located within the computing platform, the architecture comprising:
    a root organization component;
    a user organization component that is controlled by said root organization component;
    a first selling organization component that is also controlled by said root organization component and configured for access by said user organization component; and,
    at least one other selling organization component that is different than the first selling organization component but that is also controlled by said root organization component and configured for access by said user organization component.

2. The system of claim 1, wherein said user organization component comprises a shopper organization component.

3. The system of claim 2, wherein said user organization component further comprises an administrative organization component.

4. The system of claim 1, wherein said first selling organization component comprises a business to consumer component.

5. The system of claim 1, wherein said first selling organization component comprises:
    a plurality of reseller organization components; and,
    a hub organization component configured to manage assets accessed by said reseller organization components.

6. The system of claim 5, wherein said hub organization comprises:
    an asset organization component configured to manage assets accessed by said reseller organization components; and,
    a management organization component configured to manage access to said assets by said reseller organization components.

7. A method of deploying multiple e-commerce systems in a single computing platform, the method comprising the steps of:
    co-locating first and second instances of a business logic component for respectively different first and second business operations together in the single computing platform comprising a computing server coupled to one or more computing clients over a computer communications network, the computing server being configured to host one or more e-commerce systems representative of one or more respective business operations, the computing server including an application server programmed to host and manage a distributable application over the network, the computing server further including a data store configured to store an application interface to one ro more applications operating through the application server, the computing server also including a defined business operation application architecture created through the application server and supporting corresponding business operations co-located within the computing platform, the architecture comprising a root organization component, a user organization component that is controlled by said root organization component, a first selling organization component that is also controlled by said root organization component and configured for access by said user organization component, and at least one other selling organization component that is different than the first selling organization component but that is also controlled by said root organization component and configured for access by said user organization component;
    associating at least one instance of a first business facility with said first instance of said business logic component; and,
    associating at least one instance of a second business facility with said second instance of said business logic component.

8. The method of claim 7, further comprising the steps of:
creating an instance of a business provisioning hub component;
associating said instance of said business provisioning hub component with an instance of a third business facility; and,
managing access by other instances of business logic components to said third business facility in said instance of said business provisioning hub component.

9. A machine readable storage comprising a device having stored thereon a computer program for deploying multiple e-commerce systems in a single computing platform, the computer program comprising a routine set of instructions which when executed by a machine cause the machine to perform the steps of:
co-locating first and second instances of a business logic component for respectively different first and second business operations together in the single computing platform comprising a computing server coupled to one or more computing clients over a computer communications network, the computing server being configured to host one or more e-commerce systems representative of one or more respective business operations, the computing server including an application server programmed to host and manage a distributable application over the network, the computing server further including a data store configured to store an application interface to one ro more applications operating through the application server, the computing server also including a defined business operation application architecture created through the application server and supporting corresponding business operations co-located within the computing platform, the architecture comprising a root organization component, a user organization component that is controlled by said root organization component, a first selling organization component that is also controlled by said root organization component and configured for access by said user organization component, and at least one other selling organization component that is different than the first selling organization component but that is also controlled by said root organization component and configured for access by said user organization component;
associating at least one instance of a first business facility with said first instance of said business logic component; and,
associating at least one instance of a second business facility with said second instance of said business logic component.

10. The machine readable storage of claim 9, further comprising the steps of:
creating an instance of a business provisioning hub component;
associating said instance of said business provisioning hub component with an instance of a third business facility; and,
managing access by other instances of business logic components to said third business facility in said instance of said business provisioning hub component.

* * * * *